S. RAYMOND.
Cooking Stove.

No. 63,093.

Patented March 19, 1867.

Witnesses:
Theo Tusche
Wm Treurn

Inventor
S. Raymond
Per Munn & Co
Attorney

United States Patent Office.

SEYMOUR RAYMOND, OF MIDDLETOWN, PENNSYLVANIA, ASSIGNOR TO HIMSELF AND J. CAMPBELL, OF SAME PLACE.

*Letters Patent No. 62,093, dated March 19, 1867.*

IMPROVEMENT IN STOVE COVERS FOR COOKING STOVES.

*The Schedule referred to in these Letters Patent and making part of the same.*

TO ALL WHOM IT MAY CONCERN:

Be it known that I, SEYMOUR RAYMOND, of Middletown, in the county of Dauphin, and State of Pennsylvania, have invented a new and useful Improvement in Cook Stoves; and I do hereby declare that the following is a full, clear, and exact description thereof, which will enable others skilled in the art to make and use the same, reference being had to the accompanying drawings, forming part of this specification, in which—

Figure 2:
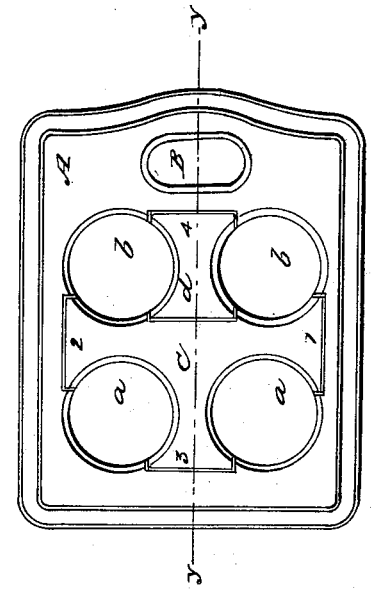
Figure 4:
Figure 1:
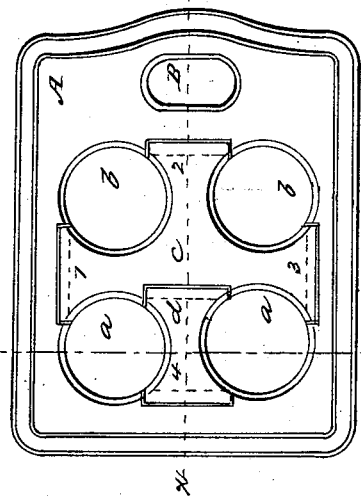
Figure 3:
Figure 5:

Figure 1 is a top view of the upper plate of a cook stove, with the division plates in one position.
Figure 2 is the same view, showing the division plates in a reversed position.
Figure 3 is a cross-section, taken in the line $x\ x$, fig. 1.
Figure 4 is a cross-section, taken in the line $y\ y$, fig. 2.
Figure 5 is a cross-section, taken in the line $z\ z$, fig. 1.
Similar letters of reference indicate like parts.

This invention relates to an improvement in the tops of cooking stoves, and consists in making the division plates for the pot holes in such manner that they may be reversed in their position or turned upside down for the purpose of equalizing the action of the heat and preventing them from becoming warped and ruined by the constant action of the fire on one side only, to which they are exposed when the plates are not reversible, as commonly constructed.

A represents the main upper plate of a cook stove; B is the smoke pipe; $a\ a$ are pot holes over the fire-chamber, and $b\ b$ pot holes behind it, formed and separated by two movable division plates, of which $c$ is the larger one, having three ends, 1, 2, 3, that rest in recesses upon the main plate A, and $d$ is the smaller plate, with one end, 4, resting also in a recess on the plate A, in the usual way, while the other opposite end rests upon the division plate $c$. The end of the plate $d$ that rests upon the plate $c$ is made with a groove, $s$, in it to fit a corresponding tongue on the plate $c$ in such manner that it can lie either side up, alike, as shown in figs. 3, 4. The division plates $c\ d$ are also made with a central rib or tongue, $n$, in the curves of the pot holes, forming a recess and shoulder on both sides alike, for receiving and supporting the bottoms of the pots, so that the plates may be reversed in position or turned upside down at pleasure and hold the pots equally well on either side, as shown in section of plate $d$, fig. 5. It is manifest that the division plates $c\ d$, being so constructed, may be shifted in their position on the plate A, so that the smaller plate $d$ shall set over the fire-chamber, forming in part the pot holes $a\ a$, as seen in fig. 1, or in the rear, forming the pot holes $b\ b$, as seen in fig. 2, or may be placed at the sides; and also that the division plates may be indifferently placed either side up and fit in any position equally as well, so that they may be shifted at pleasure. Thus whenever the fire shall begin to act unduly on one side, by drawing and warping them out of shape, they may be turned upside down, and the effect of the heat be equalized, so as to keep the plates true and serviceable.

I disclaim the construction of the plates $c\ d$, so far as concerns the shifting of their positions laterally only by moving the plate $d$ to the back or front or sides, or when in any of those four positions, by removing the plate $d$, so that a boiler may be set in four positions over the two pot holes.

Having thus described my invention, I claim as new, and desire to secure by Letters Patent—

Reversible pot-hole division plates in the upper plate of a cook stove, constructed and operating substantially as and for the purpose herein described.

SEYMOUR RAYMOND.

Witnesses:
J. SCHAEFFER,
WM. E. SHEAFFER